B. WEISE.
IMPLEMENT FOR ACROBATIC TRICKS.
APPLICATION FILED JAN. 26, 1915.
1,141,292.
Patented June 1, 1915.
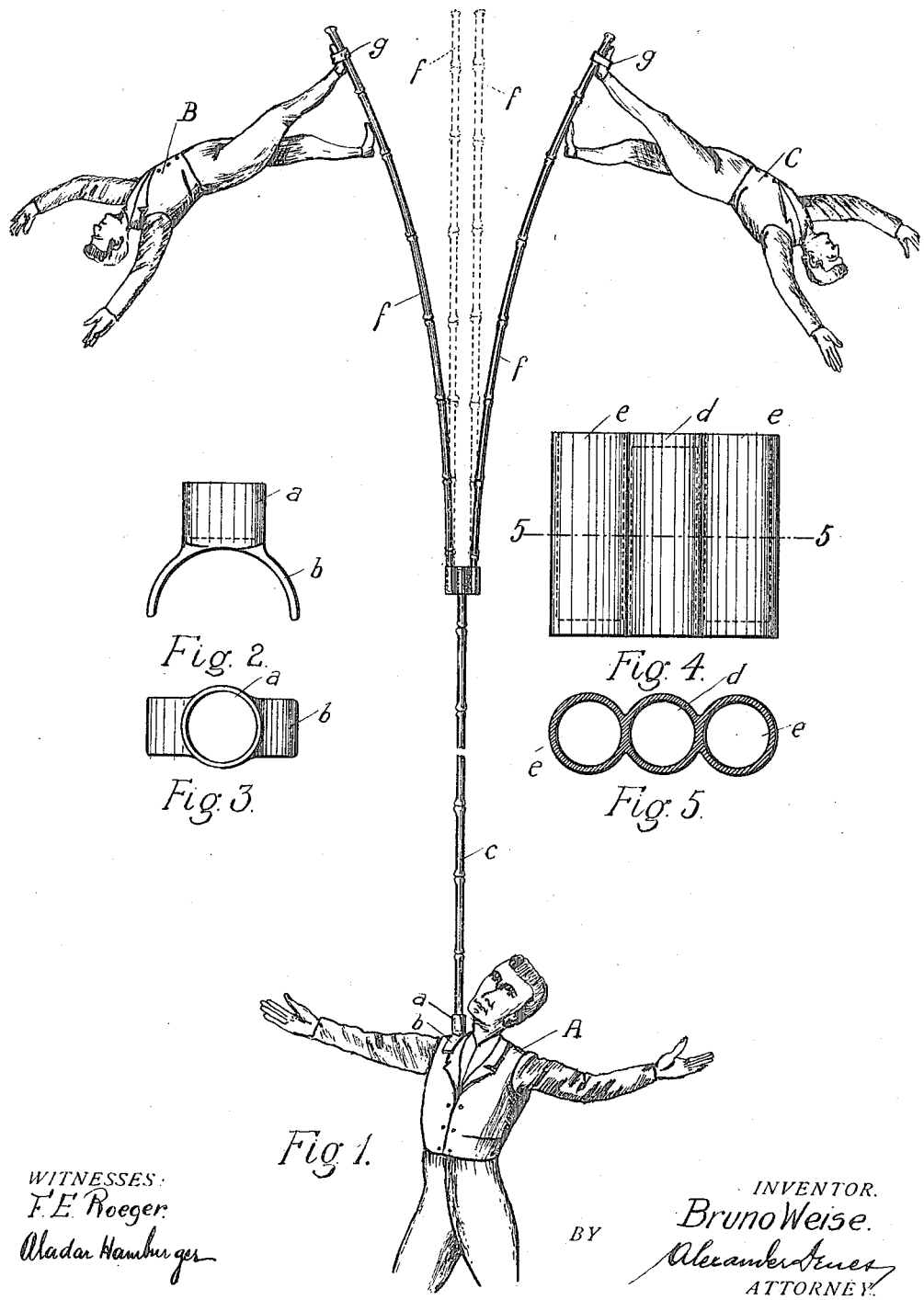

UNITED STATES PATENT OFFICE.

BRUNO WEISE, OF NEW YORK, N. Y.

IMPLEMENT FOR ACROBATIC TRICKS.

1,141,292.     Specification of Letters Patent.     Patented June 1, 1915.

Application filed January 26, 1915. Serial No. 4,463.

*To all whom it may concern:*

Be it known that I, BRUNO WEISE, a subject of the Emperor of Germany, residing at New York, in the county of New York and State of New York, have invented new and useful Improvements in Implements for Acrobatic Tricks, of which the following is a specification.

My invention relates to an implement for acrobatic tricks and has for its object to provide a device of this character whereby one performer may support above his head two other performers balancing in the air and perform different evolutions of a novel and interesting character.

In the accompanying drawing: Figure 1 is an elevational view of my device in one form of its use, showing an altered position of certain parts thereof in dotted lines. Fig. 2 is an elevational view and Fig. 3 a plan view of a detail of my device, on an enlarged scale. Fig. 4 is an elevational view of another detail of my device and Fig. 5 is a cross section of the same, taken on the line 5—5 of Fig. 4.

Similar letters refer to similar parts throughout the several views.

Referring more particularly to the drawing, *a* is a ferrule integral with a shoulder-strap *b* fitting on the shoulder of a performer A, partly shown, standing on the ground. Into the ferrule *a* is inserted the lower end of a vertical pole of tough, resilient material of light weight, such as a bamboo cane or an artificial cane, *c*, fractionally shown in the drawing. On top of the pole *c* I place a triple ferrule, the central section *d* of which is closed at its top and accommodates the upper end of the pole *c*, whereas the two lateral sections *e* are closed at their bottom and take up each one pole *f* similar to the pole *c*, the whole thus forming practically a stem with two branches at the top.

The branches or poles *f* are provided, near their upper ends, with straps *g* adapted to accommodate and firmly hold one foot of a performer, each.

In performing the tricks, the device is first placed on the shoulder of a performer A, standing on the ground. Then two other performers, B and C, climb up first the stem of the device, *c*, and then, simultaneously, each one branch *f*. When reaching the top of the branches *f*, the performers B and C insert one foot each in the respective strap *g* and hang therefrom perpendicularly, while the branches *f* are in the position indicated in dotted lines in Fig. 1. When the performers B and C stem their unengaged foot against the poles *f*, the same take the position indicated in full lines in the drawing, the performers at the same time projecting their body practically into a horizontal position, as shown. In this position, then, various tricks of a novel and fascinating nature, such as the contortion of the bodies of the performers B and C etc., may be performed.

It is understood, that while I have thus shown the preferred form of my invention, I do not want to be limited to its mechanical or other details and may resort to such alterations and modifications as come within the scope of the claims hereunto appended.

I claim:

1. An acrobatic implement comprising, in combination, a stem made of resilient light material, means for conveniently supporting said stem on the shoulder of a person, a plurality of branches of similar material as said stem, connected thereto at its upper end, normally parallel therewith and adapted to be bent by the weight of a person suspended from the upper end of said branches, and means for the suspension of a person by one of its feet near the upper end of each of said branches, substantially as and for the purpose set forth.

2. In a device of the character described, in combination, a ferrule integral with a shoulder-strap fitting on the shoulder of a man, a pole inserted in said ferrule adapted to be carried therein in a vertical position, a triple ferrule having a central section closed at its top, placed on top of said pole, and two lateral sections closed at their bottom, one pole similar to said first mentioned pole inserted in each of said lateral sections of said triple-ferrule and supported therein normally in a vertical position, and straps adapted to take up the foot of a person fastened to said last mentioned two poles near the upper ends thereof, substantially as and for the purpose set forth.

BRUNO WEISE.

Witnesses:
ALADAR HAMBURGER,
ALEXANDER DENES.

Copies of this patent may be obtained for five cents each, by addressing the "Commissioner of Patents, Washington, D. C."